United States Patent
Bellamy et al.

(10) Patent No.: US 9,218,321 B2
(45) Date of Patent: *Dec. 22, 2015

(54) CREATING TAG CLOUDS BASED ON USER SPECIFIED ARBITRARY SHAPE TAGS

(71) Applicant: International Business Machines Corporation, Armonk, NY (US)

(72) Inventors: Rachel K. E. Bellamy, Bedford, NY (US); Michael Desmond, White Plains, NY (US); Jacquelyn A. Martino, Cold Spring, NY (US); Paul M. Matchen, Bethel, CT (US); Harold L. Ossher, South Salem, NY (US); John T. Richards, Chappaqua, NY (US); Calvin B. Swart, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 345 days.

This patent is subject to a terminal disclaimer.

(21) Appl. No.: 13/752,483

(22) Filed: Jan. 29, 2013

(65) Prior Publication Data

US 2014/0215298 A1 Jul. 31, 2014

(51) Int. Cl.
*G06F 17/30* (2006.01)
*G06F 17/21* (2006.01)
*G06F 17/20* (2006.01)

(52) U.S. Cl.
CPC .............. *G06F 17/21* (2013.01); *G06F 17/20* (2013.01); *G06F 17/30277* (2013.01); *G06F 17/30722* (2013.01)

(58) Field of Classification Search
CPC ............ G06F 17/241; G06F 17/30722; G06F 17/242; G06F 17/2785; G06F 17/30011; G06F 17/30014; G06F 17/3071; G06F 17/30713

See application file for complete search history.

(56) References Cited

U.S. PATENT DOCUMENTS

| | | | |
|---|---|---|---|
| 6,028,610 A | 2/2000 | Deering | |
| 6,356,922 B1 * | 3/2002 | Schilit et al. | 715/236 |
| 6,565,611 B1 * | 5/2003 | Wilcox et al. | 715/203 |
| 7,729,538 B2 * | 6/2010 | Shilman et al. | 382/181 |
| 7,752,534 B2 | 7/2010 | Blanchard, III et al. | |
| 8,095,538 B2 * | 1/2012 | Hawking | 707/728 |
| 2008/0092044 A1 * | 4/2008 | Lewis et al. | 715/713 |
| 2009/0182727 A1 * | 7/2009 | Majko | 707/5 |
| 2010/0313220 A1 * | 12/2010 | Yoon et al. | 725/40 |
| 2011/0263204 A1 | 10/2011 | Isomursu et al. | |
| 2011/0307792 A1 * | 12/2011 | DeLuca | 715/736 |

(Continued)

OTHER PUBLICATIONS

U.S. Appl. No. 13/752,550.

(Continued)

*Primary Examiner* — Wilson Tsui
(74) *Attorney, Agent, or Firm* — Stephen J. Walder, Jr.; Nidhi Garg

(57) ABSTRACT

Mechanisms are provided for generating a shape tag cloud display. A user input is received that specifies an arbitrarily hand-drawn shape tag. A set of shape tag equivalence classes is updated based on the received user input to assign the arbitrarily hand-drawn shape tag to a shape tag equivalence class having similar previously entered arbitrarily hand-drawn shape tags. Rankings of the shape tags relative to one another are generated. The shape tag cloud display is generated based on the rankings. A representation of each shape tag within the shape tag cloud display has display characteristics based on the rankings. The shape tag cloud display is then output.

14 Claims, 5 Drawing Sheets

(56) References Cited

U.S. PATENT DOCUMENTS

2012/0030368 A1    2/2012    John et al.
2012/0041947 A1    2/2012    Maeda et al.
2012/0042284 A1    2/2012    Liesche et al.
2012/0053930 A1    3/2012    Bangalore et al.

OTHER PUBLICATIONS

"Similar Images graduates from Google Labs", Google, http://googleblog.blogspot.com/2009/10/similar-images-graduates-from-google.html, Oct. 27, 2009, 2 pages.

"Tagxedo—Word Cloud with Styles", http://www.tagxedo.com, accessed on Mar. 28, 2012, 1 page.

"TinEye Reverse Image Search", Idee, Inc., http://www.tineye.com, accessed on Feb. 18, 2013, 1 page.

Szablewski, "PhobosLab", http://www.phoboslab.org/log/2007/11/image-clouds, Nov. 13, 2007, 5 pages.

Whittaker, Steve et al., "Temporal Tagging: Implicit Behavior Identifies Points of Interest in Complex Event Recordings", AAAI Social Information Processing Symposium, Stanford University, California, Mar. 26-28, 6 pages.

\* cited by examiner

CREATING TAG CLOUDS BASED ON USER SPECIFIED ARBITRARY SHAPE TAGS

BACKGROUND

The present application relates generally to an improved data processing apparatus and method and more specifically to mechanisms for creating tag clouds based on user specified arbitrary shape tags.

Increasingly, people create textual "tags" and associate them with various forms of content, such as web pages and the like. These tags may be keywords indicative of the content and are themselves searchable, thereby enabling other users to find the associated content and retrieve the content for additional processing, such as display or analysis.

Textual tags may be rendered as a "tag cloud." A tag cloud is a visual representation of the textual tags in which characteristics of the textual string of the textual tag, such as size or color, is set for each textual tag to a setting that represents the number of instances of that particular tag in a collection of tags. That is, for example, textual tags having a number of instances above a first threshold may have their textual string rendered with a first color or size in the tag cloud while other textual tags having a number of instances that are below this first threshold may have their textual string rendered in a second color or size in the tag cloud. In this way, a user can visualize which textual tags have a relatively larger number of instances than others. In other words, the various representations of the textual strings of the textual tags in the tag cloud may present a visualization of the relative popularity of each of the textual tags. An example mechanism for generating a tag cloud is described in commonly owned U.S. Pat. No. 7,752,534.

The use of tag clouds has recently been extended to image documents as well, so called "image clouds." With such implementations, the size of the image in the visual array of the tag cloud is an indicator of the frequency of the image in, for example, a collection of web pages. The frequency of the image may be measured in terms of the number of times that the image is linked to in webpages on the Internet, for example. However, in the case of image clouds, the representations in the tag cloud, i.e. the tags, are thumbnail versions of already embedded images in web pages. There is no ability for an end user to specify what constitutes a tag to be used in the generation of an image cloud. The tags are the already embedded or linked to images, as a whole, in the web pages.

SUMMARY

In one illustrative embodiment, a method, in a data processing system, is provided for generating a shape tag cloud display. The method comprises receiving, in the data processing system, a user input specifying an arbitrarily hand-drawn shape tag and updating a set of shape tag equivalence classes within the data processing system based on the received user input to assign the arbitrarily hand-drawn shape tag to a shape tag equivalence class having similar pre-existing arbitrarily hand-drawn shape tags. The method further comprises generating, by the data processing system, rankings of the shape tags, in the shape tag equivalence classes relative, to one another. Moreover, the method comprises generating, by the data processing system, the shape tag cloud display based on the generated rankings. A representation of each shape tag in the set of shape tag equivalence classes, within the shape tag cloud display, has display characteristics based on the generated rankings. The method further comprises outputting, by the data processing system, the shape tag cloud display.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
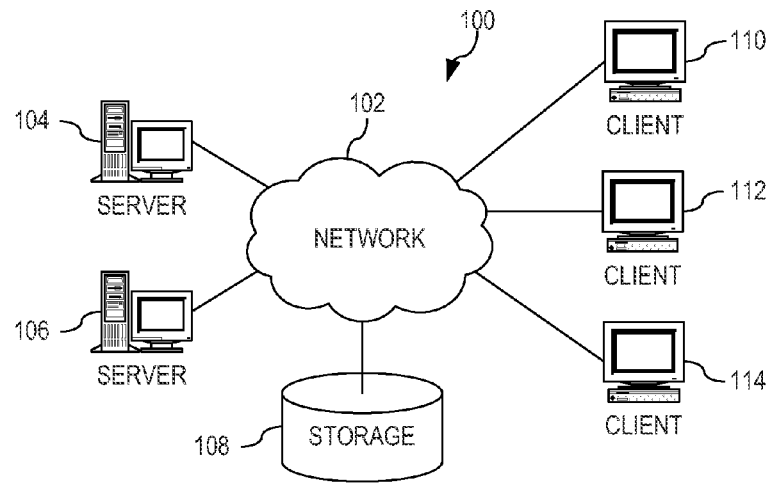
FIG. 1 is an example diagram of a distributed data processing system in which aspects of the illustrative embodiments may be implemented.

The illustrative embodiments provide a mechanism for creating tag clouds based on user specified arbitrarily selected shape tags. With the illustrative embodiments, the user may specify an arbitrary shape to be used for generating a tag that represents, for example, some aspect of a document or a portion of a document and which may later be used in generating a tag cloud. This "shape tag" may be a hand-drawn shape entered by the user, a selection of a previously stored hand-drawn shape from a library or palette of shapes, a combination of one or more previously defined shape tags, a portion of a previously defined shape tag, or the like, for example. In one illustrative embodiment, the shape tag corresponds to a hand-drawn shape annotation to a document, such as a web page or other electronic document, e.g., a check mark, star, or any other shape drawn on a page of the electronic document. In other illustrative embodiments, the hand-drawn shape may be used to designate a portion of an already existing image (and less than the whole image) in the document, e.g., circling or otherwise selecting a portion of the existing image via a user's manipulation of an input device. In still further illustrative embodiments, the shape tag may be designated as a combination of a plurality of other previously generated shape tags, portions of images, or other combinations of such shape tags and images, e.g., a combination of a one or more shape tags and one or more portions of one or more images.

The shape tag may be analyzed to generate characteristic information about the shape tag which may be used for comparison with other shape tags associated with other electronic documents in a collection of electronic documents for purposes of grouping the shape tag with similar shape tags in a shape tag equivalence class, of which there may be a plurality of shape tag equivalence classes. The collection of electronic documents may be, for example, web pages and other electronic documents generally available via the Internet, a wide area network, local area network, or other collection of computing devices communicatively coupled to one another via one or more communication connections, whether wired or wireless. Alternatively, the collection of electronic documents may be a localized collection, such as in a single database system or even a storage device on a user's machine.

The analysis performed on the shape tag may take many different forms depending on the type of source of the shape tag's hand-drawn image. For example, if the source of the image for the shape tag is a raster source, such as a bitmap or other dot matrix data structure, then a pixel count based analysis, pixel color analysis, and the like, may be used. Alternatively, an analysis of the primary contours or gradients in the image may be used to extract features or strokes from the image. If the source of the image for the shape tag is a vector source that uses geometrical primitives to compose the image, then the analysis may include determining one or more mathematical formula for generating the image, analysis to generate a table of data points of the image, centerpoint and radius analysis, or the like.

The resulting characteristics may be compared against similarly generated characteristics for other shape tags previously associated with electronic documents to determine matches within a given tolerance, if any. For example, a degree of difference may be set by the user, e.g., 75% matching pixels, may be allowed to enable greater chances of finding tags associated with electronic documents in the electronic document collection that match the shape tag, however the greater the difference allowed, the higher likelihood that the results of the matching will be inaccurate. Thus, this degree of difference, or tolerance, value should be set to an appropriate level to balance these considerations, which may be determined empirically or through trial and error. Based on the results of the comparisons between characteristics of the shape tag with characteristics of the other shape tags, the shape tag may be assigned to a particular shape tag equivalence class having a shape tag, or collection of shape tags, having a highest degree of matching between the characteristics.

The electronic documents in the collection of electronic documents associated with shape tags may take many different forms. For example, the electronic documents may be a file on a computing device, such as a server or client computing device, a file located on a shared or non-shared storage device, a collection of files in, for example, a folder, or the like. The files may be of many different types including, but not limited to, hypertext markup language (HTML) document files, PDF, image, audio, or video electronic documents, or a combination of any of these. In some illustrative embodiments, the collection of electronic documents may be a collection of files resulting from a saved query on a database, through an Internet search engine, or any other query engine directing its query to a larger set of electronic documents.

The comparison of the characteristics of the shape tag with other shape tags associated with electronic documents in the electronic document collection results in determinations as to matches between the shape tag and other tags previously associated with electronic documents in the electronic document collection. From this, a measure of the degree of matching may be generated. For example, for each shape tag equivalence class, a total number of matching shape tags (within a given tolerance), a frequency of occurrence of matching shape tags, usage statistics for electronic documents associated with matching shape tags, etc. can be used to determine a degree of matching. In addition, a sub-set of tags previously associated with electronic documents may be defined and links to the associated electronic documents in the sub-set may be stored in association with the shape tag.

Furthermore, additional information regarding the matching electronic documents may be collected and used to generate additional statistical characteristics for the shape tag. For example, statistics regarding the frequency of accessing the electronic documents by users, frequency of selection of the links within the electronic document by users, e.g., "click-throughs", and the like, may be used to generate additional statistical characteristic information that may be used when determining how to represent the shape tag in the shape tag cloud.

The measure of matching for the shape tag with other shape tags in its corresponding shape tag equivalence class may be compared against other measures of matching for other shape tags within the equivalence class to determine a relative ranking of the shape tags based on the measure of matching. The measure of matching may be weighted or otherwise modified by the additional statistical characteristic information gathered from the electronic documents having matching shape tags, e.g., weighted based on "click-throughs".

This relative ranking is an indication of the relative importance and/or popularity of the shape tag within the collection of shape tags associated with documents in the collection, e.g., shape tags within the same shape tag equivalence class. In addition, shape tag equivalence classes may be ranked relative to each other based on various characteristics of the shape tag equivalence class including, but not limited to, the number of shape tags in the shape tag equivalence class, usage statistics associated with electronic documents with which the shape tags are associated in the shape tag equivalence class, etc. In one illustrative embodiment, the resulting ranking of a particular shape tag may therefore be a combination of the relative ranking of the shape tag within the shape tag equivalence class, and the relative ranking of the shape tag equivalence class with regard to other shape tag equivalence classes, for example. In other illustrative embodiments, the shape tag ranking may be purely based on the relative ranking of the shape tag with regard to all other shape tags or based solely on the relative ranking of the shape tag equivalence class. Any ranking or combination of rankings may be used to determine a final ranking for the shape tag for purposes of generating the shape tag cloud diagram.

Based on this ranking information, a shape tag cloud diagram may be generated in which higher ranking shape tags are displayed with characteristics that conspicuously identify their relative ranking with other shape tags. For example, higher ranking shape tags may occupy relatively larger portions of the shape tag cloud display, may be highlighted in a more saturated color, may have a higher luminance, may be oriented in a different direction than other shape tags, or any of a plethora of other possible characteristics to identify those shape tags as having relatively greater overall importance. Thus, the shape tag cloud is generated such that it comprises a plurality of shape tags with each of the shape tags having the characteristics of their representation within the shape tag cloud being set according to the relative ranking of the shape tag.

It should be appreciated that this relative ranking may be determined with regard to a plurality of different characteristics of shape tags determined during the matching process. For example, in some embodiments where more than just a total number of instances of matching shape tags associated with electronic documents in the electronic document collection are taken into account, e.g., other statistical characteristics, then the relative ranking may be based on a plurality of these characteristics. Thus, the relative ranking, and therefore the representation of the shape tag in the shape tag cloud display, may be based on a more complex formulation than simply based on a raw number of occurrences of matching shape tags associated with documents within the electronic document collection.

The representation of the shape tag in the shape tag cloud display is selectable by a user. In response to a user selecting the shape tag in the shape tag cloud display, the correlating sub-set of electronic documents associated with the shape tags within the corresponding equivalence class, may be displayed to the user from which the user may select electronic documents of interest. In response to the user selecting such an electronic document from the sub-set, the stored link to the electronic document is used to redirect the user's browser or other client computing device software to the source of that electronic document so that it may be output to the user. In this way, a user may "drill-down" from the shape tag cloud to the individual electronic documents associated with the various shape tags that were used as a source of information for generating the shape tag cloud.

Thus, the illustrative embodiments provide mechanisms for generating shape tag clouds based on user specified arbitrary shapes. These shapes may be hand-drawn by the user in some illustrative embodiments and may in fact be annotations added by users to electronic documents. The shapes may be entered by the user via a user input device such as using a stylus or the user's finger to generate an input via a touch-sensitive surface of the input device, e.g., touch pad or the like. The mechanisms of the illustrative embodiments may perform analysis on the input shape so that a matching operation can be performed resulting in information that may be used to generate a shape tag cloud having representations of a plurality of shape tags, where the representations are configured according to statistical information gathered regarding the matching electronic documents.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
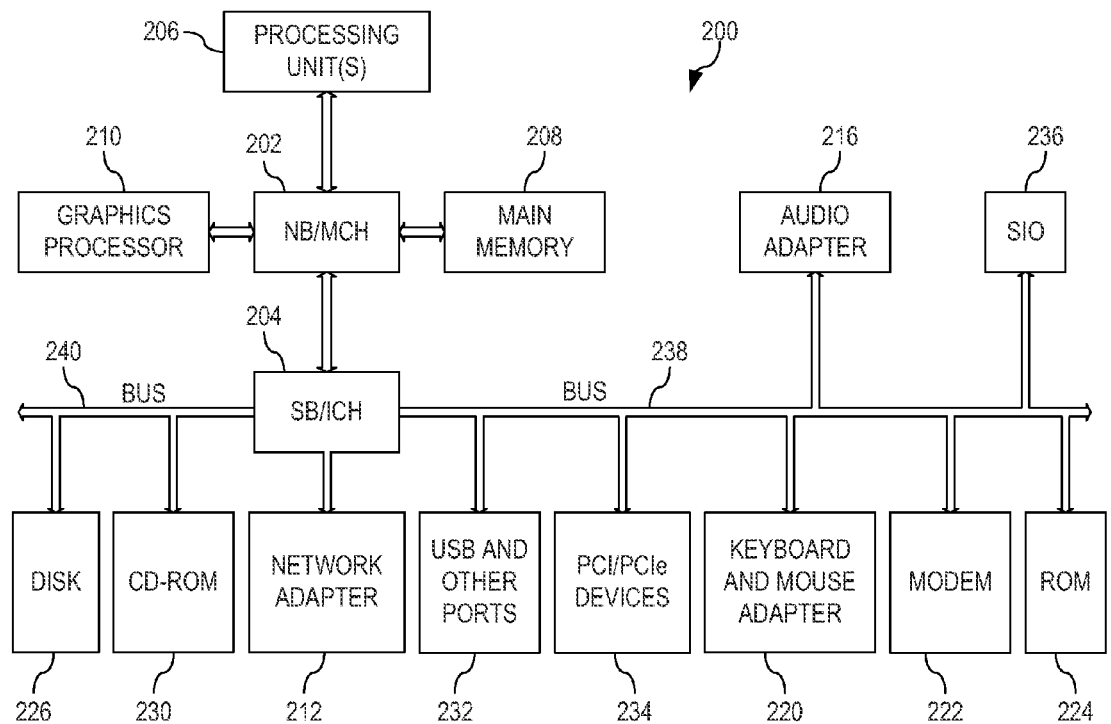
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, one or more of the computing devices depicted in FIG. 1 may be configured to include a shape tag cloud generation engine in accordance with one or more of the illustrative embodiments described herein. For example, a server 104, or client 110, may be configured to include such a shape tag cloud generation engine of the illustrative embodiments. In the case of a server 104 implementation, a user of a client device, e.g., client 110, may access the shape tag cloud generation engine remotely via network 102 to initiate, and obtain the results of, the shape tag cloud generation performed by the shape tag cloud generation engine.

Moreover, the shape tag cloud generation engine may perform its matching operations with regard to a collection of electronic documents on one or more sources of electronic documents directly coupled to the computing device in which the shape tag cloud generation engine is executing or remotely accessible via the network 102. For example, the collection of electronic documents may be electronic documents stored in a local storage device of client 110 with the shape tag cloud generation engine executing on client 110. Alternatively, the shape tag cloud generation engine may be executing on server 104 and, at the request of a user of a client computing device 110, may perform its operations on a hand-drawn shape entered by the user, selected by the user, a portion of an image, or a combination of shapes and/or portions of images, i.e. anything that may constitute an image for a shape tag as defined herein and equivalents thereof. The operations may be performed with regard to electronic documents stored in network attached storage 108, which may be a database of electronic documents, for example, electronic documents stored on storage systems associated with one or more other servers 106, electronic documents stored on storage devices associated with one or more clients 110-114, or the like.

As mentioned above, the matching operations performed by the shape tag cloud generation engine may result in a shape tag cloud having representations of the shape tags configured according to the relative rankings of the shape tags in the collection of shape tags being represented in the shape tag cloud. Moreover, these representations of the shape tags in the shape tag cloud may be user selectable, resulting in the corresponding sets of matching electronic documents being presented to the user for selection. Thus, the shape tag cloud may be returned to a user of a client 110 by server 104 (executing the shape tag cloud generation engine), and the user of client 110 may then select a shape tag representation in the shape tag cloud to thereby send a request to the server 104 to return the listing of the matching electronic documents corresponding to the selected shape tag representation. The user may then select an electronic document from the listing and thereby send a request to the server 104 to redirect the user to the source of the selected electronic document via the stored link to the electronic document stored by the server 104.

Figure 3:
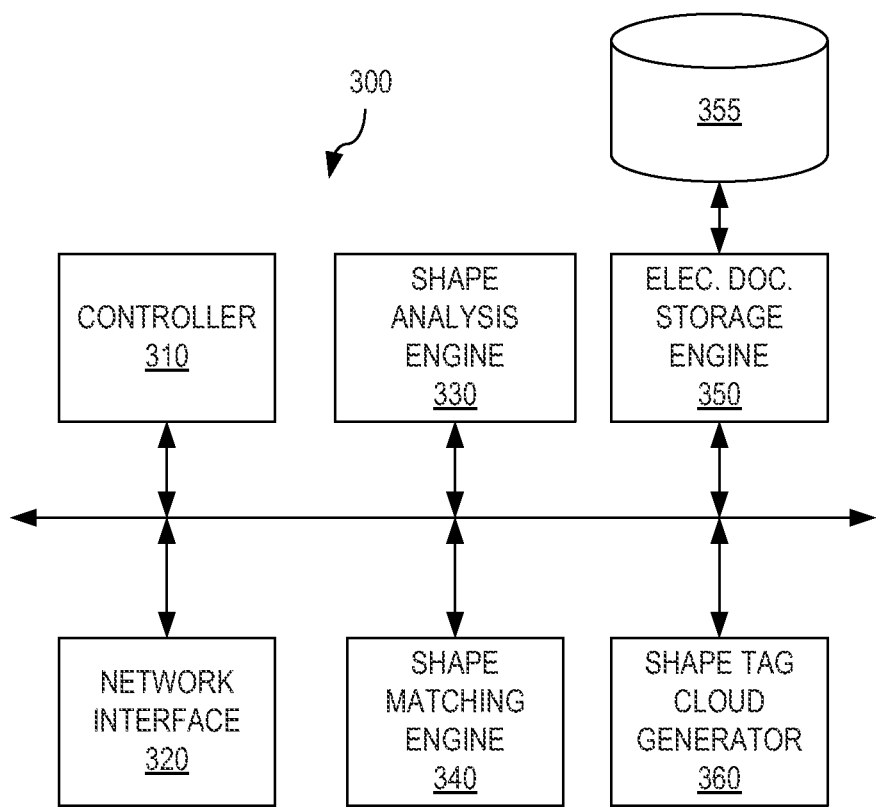
FIG. 3 is an example block diagram of a shape tag cloud generation engine in accordance with one illustrative embodiment.

FIG. 3 is an example block diagram of a shape tag cloud generation engine in accordance with one illustrative embodiment. The elements shown in FIG. 3 may be implemented in software, hardware, or any combination of software and hardware. For example, in one illustrative embodiment, the elements of FIG. 3 are implemented as software instructions loaded into one or more memories and executed by one or more processors of a data processing system. In other illustrative embodiments, all or a subset of the elements shown in FIG. 3 may be implemented in hardware implemented circuitry logic, such as Application Specific Integrated Circuits (ASICs), systems on a chip (SOCs), or the like.

As shown in FIG. 3, the elements of the shape tag cloud generation engine 300 comprise a controller 310, a network interface 320, a shape analysis engine 330, a shape matching engine 340, an electronic document storage engine 350 and corresponding storage device 355, and a shape tag cloud generator 360. It should be noted that the embodiment depicted in FIG. 3 is for a server-based implementation of the shape tag cloud generation engine. In a client-based implementation, there may be additional interfaces for user input devices, e.g., touch-sensitive input devices, stylus based input devices, track-ball, computer mouse, or other hand manipulated input devices though which an arbitrary shape or user selection of a portion of an image may be received.

The controller 310 controls the overall operation of the shape tag cloud generation engine and orchestrates the operation of the other elements 320-360. The network interface 320 provides a data communication pathway through which the shape tag cloud generation engine 300 receives data from an outside source, e.g., a client computer, electronic document source, or the like, via one or more networks, and provides data output to outside computing devices via the one or more networks. Thus, via the network interface 320, the shape tag cloud generation engine 300 may receive user input from a client computing device via one or more networks and may send results of the shape tag cloud generation operations back to the client computing device via the one or more networks.

A user of the client computing device may submit a collection of strokes or an image of a shape to be used by the shape tag cloud generation engine 300 for analysis, storage, and eventual generation of a shape tag cloud. This shape may be the input of a hand-drawn or hand-written element entered by the user via a pointing device or other user manipulated input device capable of generating arbitrary shapes at the direction of the user based on the user's manipulation of the input device. These shapes themselves may constitute the image for the shape tag, or may be used to select a portion of an image, less than the whole image, of an electronic document that is to be used as the image for the shape tag. Importantly, these shapes can be entirely arbitrary, bearing no relation to the document or elements of the document or images within the document per se. For example, a hand-drawn star may be created with the intent of simply marking a document as being of high quality or of particular interest within some scope of inquiry.

In one illustrative embodiment, the shape for the shape tag is entered by a user via the manipulation of a touch-sensitive surface, such as may be provided on a modern touch pad, touch screen, or the like. The user's input may be provided by the user manipulating a stylus' contact with the touch-sensitive surface, the user's manipulation of his/her finger on the touch-sensitive surface, or the like. Thus, a user may enter a shape using a free-hand approach to draw the shape on the touch-sensitive surface which then converts the input to a digital form. The shape, or the portion of an image selected by entry of the shape, may then be stored as input to be used subsequently by the shape tag cloud generation engine 300.

In addition rather than the user entering a new shape for a shape tag, the user may use his/her input device to select a previously stored hand-drawn shape from a library or palette of shapes stored locally or in a server associated storage associated with the shape tag cloud generation engine 300 (not shown), a combination of one or more previously defined shape tags, a portion of a previously defined shape tag, or the like, for example. In one illustrative embodiment, the shape tag corresponds to a hand-drawn annotation to a document being displayed or stored in by the client computing device that the user is using, such as a web page or other electronic document, e.g., a check mark, star, or any other shape drawn on a page of the electronic document. In other illustrative embodiments, the hand-drawn shape may be used to designate a portion of an already existing image (and less than the whole image) in the document, e.g., circling or otherwise selecting a portion of the existing image. In still further illustrative embodiments, the shape tag may be designated as a combination of a plurality of other previously generated shape tags, portions of images, or other combinations of such shape tags and images, e.g., a combination of a one or more shape tags and one or more portions of one or more images.

The shape analysis engine 330 analyzes the arbitrarily generated shape entered by the user to extract data based characteristics for the shape which can be used as a basis for performing a matching operation with other shape tags associated with stored electronic documents in a collection of electronic documents. These data based characteristics may be any of a plurality of different types of characteristics which may also depend on the type of source being used to generate the shape tag. For example, as mentioned above, if the shape tag is from a raster source, such as a bitmap or other dot matrix data structure, then a pixel count based analysis, pixel color analysis, major contour analysis, and the like, may be used. If the shape tag is from a vector source that uses geometrical primitives to describe the input, then the analysis may include determining one or more mathematical formula for generating the shape, analysis to generate a table of data points of the shape, centerpoint and radius analysis, or the like.

The shape analysis engine 330 may further perform similar analysis on other shape tags associated with electronic documents in an electronic document collection. That is, the shape tags associated with other electronic documents in the electronic document collection may be identified automatically through an analysis of the electronic document, metadata associated with the electronic document, and the like, and then analyzed in a similar manner to that of the user entered arbitrary shape. In this way, a corresponding set of characteristic data for the shape tags associated with the various electronic documents in the electronic document collection may be generated and stored in association with the electronic document in their various sources or in association with links to these electronic documents in a data structure associated with the shape tag cloud generation engine 300, such as in electronic document storage 355.

The collection of electronic documents, which are associated with shape tags that are the subject of the matching operation, may be, for example, web pages and other electronic documents generally available via the Internet, a wide area network, local area network, or other collection of computing devices communicatively coupled to one another via one or more communication connections, whether wired or wireless. Alternatively, the collection of electronic documents may be a localized collection, such as in a single database system, a local storage device, or the like.

As mentioned previously, the electronic documents may be a file on a computing device, such as a server or client computing device, a file located on a shared or non-shared storage device, a collection of files, or the like. The files may be of many different types including, but not limited to, hypertext markup language (HTML) document files, PDF, image, audio, or video electronic documents, or a combination of any of these. In some illustrative embodiments, the collection of electronic documents may be a collection of files resulting from a saved query on a database, through an Internet search engine, or any other query engine directing its query to a larger set of electronic documents. Thus, for example, the shape tag cloud generation engine 300 may operate in conjunction with a search that is performed by another software component executing on the same or different computing device as the shape tag cloud generation engine 300. The results of the search may be a sub-set of the electronic documents available from the various sources of electronic documents and the operations of the shape tag cloud generation engine 300 may operate on shape tags associated with this sub-set when trying to find matching shape tags associated with electronic documents.

The shape matching engine 340 may perform the actual operation of determining if a shape tag previously associated with an electronic document matches the image or shape of the shape tag entered by the user. That is, the various resulting data based characteristics of the user entered arbitrary shape tag are compared against similar data based characteristics of previously entered shape tags to determine a degree of matching. For example, pixel by pixel comparisons can be performed to determine if similar pixels are at similar locations within the user entered arbitrary shape tag and the shape tag associated with the electronic document. A tolerance value may be entered by the user, or set by default, to allow some difference between the user entered shape tag and the shape tags associated with the other electronic documents, e.g., 75% matching pixels. If the shape tags associated with the other electronic documents match the user entered shape tag within the given tolerance, then it is determined that the shape tag associated with the other electronic document matches the user entered shape tag. If the shape tag associated with the other electronic documents do not match the user entered shape tag within the given tolerance, then it is determined that the previously entered shapes/images do not match the user entered shape tag.

The comparison of the characteristics of the shape tag with other shape tags associated with electronic documents in the electronic document collection results in determinations as to matches between the shape tag and these other shape tags associated with other electronic documents in the electronic document collection. A listing of shape tags associated with electronic documents that match the user entered shape tag within the given tolerance may be generated by the shape matching engine 340. This listing of matching shape tags associated with electronic documents may be stored in association with the user entered shape tag in the storage device 355 by the electronic document storage engine 350. The listing entries may comprise pointers to the actual electronic documents in addition to, or rather than, the matching shape tag information. Moreover, the degree of matching of the shape tags associated with the electronic document to the user entered shape tag may also be stored in association with the entry in the listing.

From the information gathered by the shape matching engine 340 and stored in the electronic document storage device 355 by the electronic document storage engine 350, a measure of the matching may be generated for the user entered shape tag, e.g., total number of matching shape tags. Thus, for example, if the shape matching engine 340 determines that there are 5 shape tags associated with other electronic documents within the electronic document collection that match the user entered arbitrarily drawn shape tag, then the total number of matches would be 5. However, if two of these matching shape tags associated with other electronic documents have 2 matching instances of shape tags, then the total frequency of occurrence or use statistic may be determined to be 7.

Furthermore, the shape matching engine 340 may collect additional information regarding the electronic documents associated with shape tags and use this additional information to generate additional statistical characteristics for the shape tag to be used in shape tag cloud rendering. For example, statistics regarding a frequency of accessing of the electronic documents by users, frequency of selection of the matching image in the electronic document by users, e.g., "click-throughs", amount of the electronic document populated by the matching portion of the image (if a portion of an image was used as the shape tag itself), and the like, may be used to generate additional statistical characteristic information that may be used when determining how to represent the shape tag in the shape tag cloud. This information may be collected from metadata associated with the electronic documents themselves, requested from the sources of the electronic documents, or the like. For example, many web servers keep statistics for web pages regarding a number of times a web page is accessed, counts of click-throughs on advertisements or other images on the web pages, and the like. These statistics may be communicated to the shape tag cloud generation engine 300 as part of the shape cloud rendering process.

The shape tag cloud generator 360 may compare measures (such as frequency of occurrence) of the shape tags associated with the underlying document collection, (including, optionally, information derived from statistics about the documents associated with shape tags), to determine a relative ranking of the shape tags. This relative ranking is an indication of the relative importance and/or popularity of the shape tag within the shape tags associated with an electronic document collection.

Based on this ranking information, the shape tag cloud generator 360 may generate a shape tag cloud diagram in which higher ranking shape tags are displayed with characteristics that conspicuously identify their relative ranking with other shape tags. For example, higher ranking shape tags may occupy relatively larger portions of the shape tag cloud display, may be highlighted by rendering with greater saturation or luminance, may be oriented in a different direction than other shape tags, or any of a plethora of other possible characteristics to identify those shape tags as having relatively greater overall importance. Thus, the shape tag cloud is generated such that it comprises a plurality of shape tags with each of the shape tags having the characteristics of their representation within the shape tag cloud being set according to the relative ranking of the shape tags.

The resulting shape tag cloud diagram may be output to a computing device. The computing device may then display the shape tag cloud diagram on a display of the computing device in a graphical user interface or the like. For example, a client device's web browser may render the shape tag cloud on the user's client computing device after having received it from a remote server over one or more networks. In this way, the user is able to visually identify which shape tags are of relatively higher importance or popularity than others.

The representation of the shape tag in the shape tag cloud display is selectable by a user. In response to a user selecting the shape tag in the shape tag cloud display, the correlating listing of the sub-set of electronic documents having that shape tag, or a matching shape tag, may be displayed to the user from which the user may select electronic documents of interest. That is, in a server based implementation of the shape tag cloud generation engine 300, a user of a client computing device having received the shape tag cloud may select an instance of a shape tag in the shape tag cloud display and a corresponding request may be generated and transmitted back to the server requesting that the listing of electronic documents corresponding to the selected shape tag be returned to the client device. This listing may include the various statistics and may be ranked according to the determined rankings discussed above. The listing may then be output to the user of the client device via the display and graphical user interface. The user may then select an entry from the listing to drill-down into the particular electronic document corresponding to the entry.

That is, in response to the user selecting an entry for an electronic document from the listing of the sub-set of electronic documents matching the selected shape tag, a request is transmitted back to the server requesting the electronic document to be provided to the client computing device. As a result, the stored link to the electronic document is used to redirect the user's browser or other client computing device software to the source of that electronic document so that it may be output to the user. Alternatively, when providing the listing of electronic documents to the client computing device, the listing may include the links themselves and thus, the client computing device may initiate the request directly to the source of the electronic document to thereby retrieve the electronic document from the source. In this way, a user may "drill-down" from the shape tag cloud display to the individual electronic documents that are associated with shape tags in the shape tag cloud display.

Figure 4:
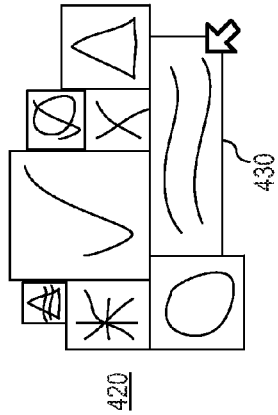
FIG. 4 is an example diagram illustrate a shape tag cloud display and corresponding graphical user interface in accordance with one illustrative embodiment.

FIG. 4 is an example diagram illustrating a shape tag cloud display and corresponding graphical user interface in accordance with one illustrative embodiment. As shown in FIG. 4, a first portion of the graphical user interface 400 includes a region 410 in which the shape tag cloud 420 is displayed with selectable representations of the shape tags 430. A second region 440 provides an area where a listing of matching electronic documents may be output when a user selects a shape tag representation in the shape tag cloud 420. Entries in the document listing are selectable by a user to cause a corresponding preview of the electronic document to be generated in the preview portion 450 of the graphical user interface 400. These various regions 410, 440, and 450 are able to be maximized, minimized, or resized to allow a user to more easily view the information contained therein. Alternatively, rather than a single graphical user interface 400, multiple windows or graphical user interfaces may be provided for displaying the various regions 410, 440, and 450 shown in FIG. 4. It should be appreciated that FIG. 4 is only an example and many modifications can be made to the output of a shape tag cloud diagram and associated displays generated in accordance with the illustrative embodiments without departing from the spirit and scope of the present invention.

Figure 5:
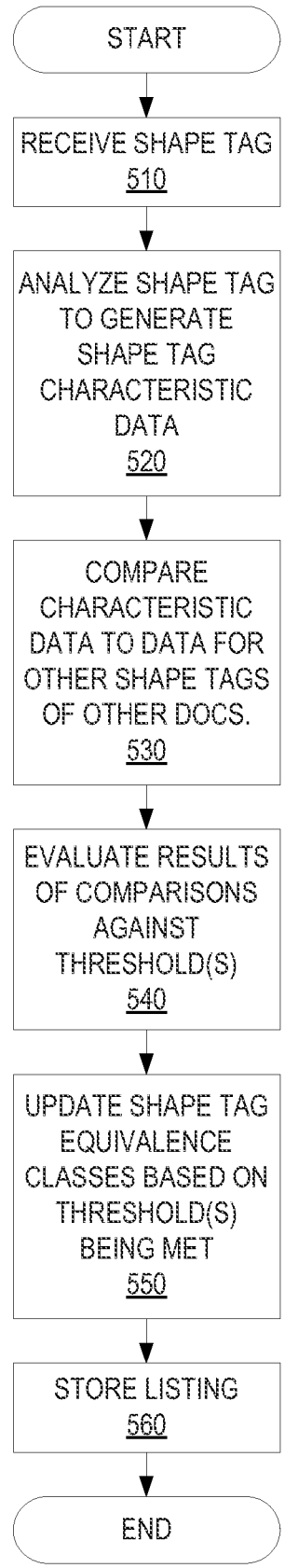
FIG. 5 is a flowchart outlining an example operation for generating a shape tag and incorporating it into a document collection in accordance with one illustrative embodiment.

FIG. 5 is a flowchart outlining an example operation for generating a shape tag and incorporating it into a document collection in accordance with one illustrative embodiment. The operation outlined in FIG. 5 may be performed, for example, by a shape tag generation engine implemented on one or more computing devices, such as a server, client computing device, or the like.

As shown in FIG. 5, the operation starts with receiving a shape tag from a user via the user's computing device (step 510). As mentioned above, the shape tag is preferably a shape tag that is input by the user via the user's freehand operation of an input device to specifically generate an arbitrary shape. This arbitrary shape itself may be the shape tag itself or may designate a portion of an already existing image in an electronic document that is to be the shape tag. Alternatively, the user may select a previously generated shape tag, combine previously generated shape tags, combine a newly entered shape tag with one or more previously generated shape tags, or combine a previously or newly entered shape tag with one or more portions of images of an electronic document to thereby generate the shape tag, for example.

Having received the shape tag, the shape tag cloud generation engine analyzes the shape tag to generate shape tag characteristic data (step 520). This shape tag characteristic data is then compared to characteristic data for shape tags previously entered in connection with documents within an electronic document collection (step 530). It should be noted that it is assumed that the scope of the electronic document collection has already been defined in some manner, either by specifying the scope to be the entire Internet or entire set of electronic documents generally available from all sources of a network, submitting the results of a search performed on electronic documents which results then constitute the electronic document collection, specifying a listing of the particular sources of electronic documents to be included in the electronic document collection, or the like.

Results of the comparisons are compared against required threshold or tolerance values to determine, for each preexisting shape tag whether it is sufficiently close to the newly entered tag to constitute a match for that shape tag (step 540). The results of these comparisons are used to update the collection of shape tag equivalence classes, adding the newly entered tag into one (or perhaps more) of the existing shape tag classes, or, alternatively creating a new class holding only a single instance, i.e., the newly entered shape tag (step 550). A listing of documents associated with the shape tags may also be updated at this point to include the document associated with the newly entered tag (step 560) for later retrieval.

Figure 6:
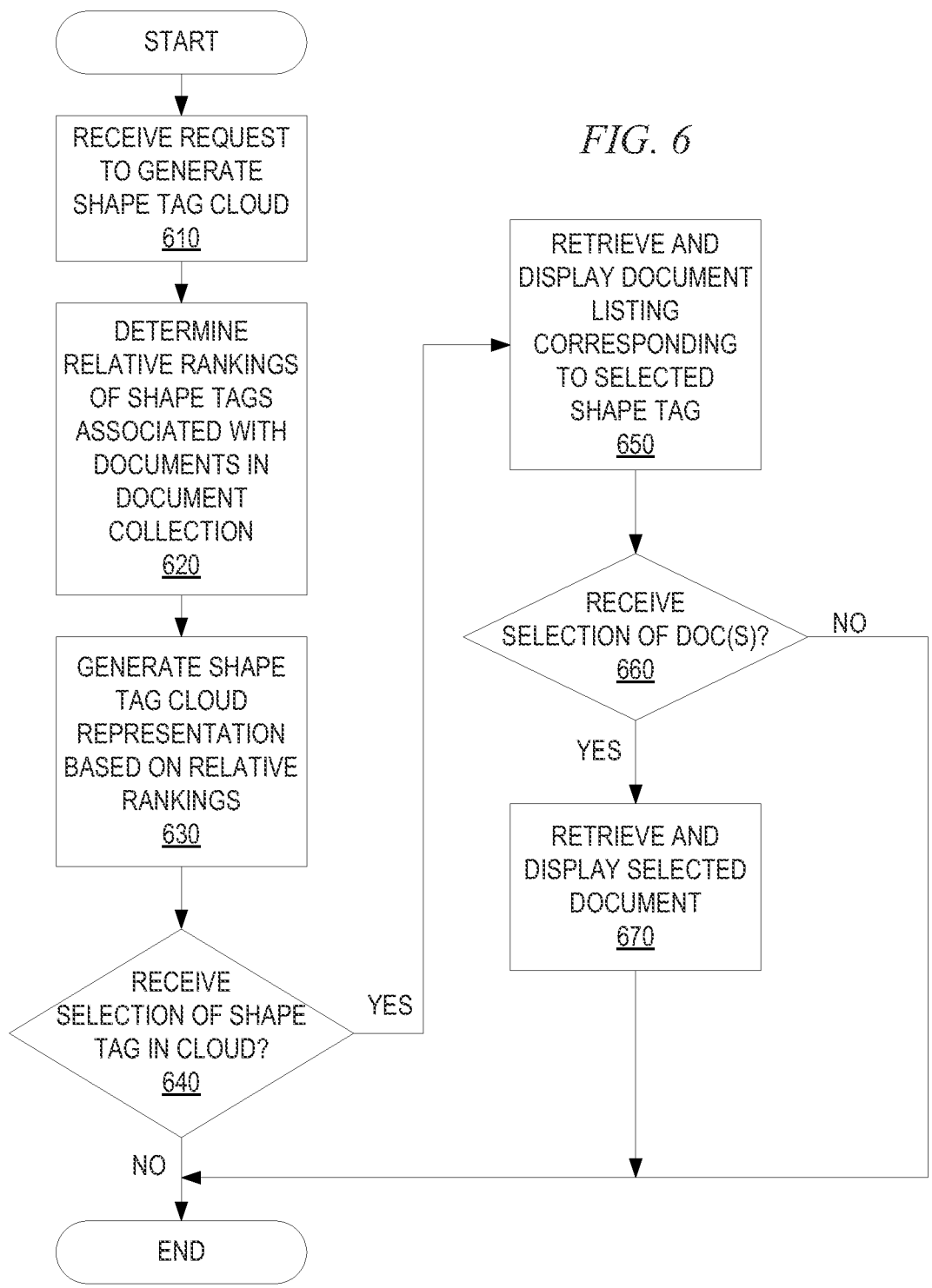
FIG. 6 is a flowchart outlining an example operation for generating a shape tag cloud in accordance with one illustrative embodiment.

At a later point in time, as illustrated in FIG. 6, a request may be received to generate a shape tag cloud for all shape tags associated with a document collection (step 610). As part of the process of forming the shape tag cloud, to form the basis for determining how a shape tag cloud is to be generated, the relative rankings of all shape tags associated with documents in the collection is computed (step 620). Previously determined equivalence classes provide the basis for, in the most typical case, counting the number of shape tags within the equivalence class in order to subsequently render a shape cloud in which visual prominence is based on the number of shape tags within each equivalence class, for example. Of course other metrics and statistics associated with the equivalence classes, as previously mentioned above, may also be used to determine the relative representation of shape tags from each of the equivalence classes in the resulting shape tag cloud display.

The results of the ranking of shape tags and equivalence classes, based on the comparison of their frequencies or other metrics, may be used to generate a shape tag cloud in which representations of the shape tags have different characteristics based on their ranking (step 630). As mentioned above, the characteristics may include saturation, luminance, size, orientation, or the like. Once rendered on, for example, a client computing device, the individual shape tags in the shape tag cloud may be selected (step 640) to retrieve the corresponding listing of matching electronic documents for display to a user (step 650) and from which the user may select one or more electronic documents (step 660) for display (step 670). These operations for drilling down in the shape tag cloud are optional.

Thus, the illustrative embodiments provide mechanisms for generating shape tag cloud displays based on a collection of user input arbitrarily hand-drawn shape tags. The illustrative embodiments provide mechanisms for determining equivalence classes of similar shape tags in order to derive frequencies of shape tags within the collection of all shape tags associated with a document collection. Based on these frequencies (or other metrics), the representation of each shape tag relative to other shape tags in the collection of shape tags may be configured to conspicuously order the shape tag within the range of such statistics relative to other shape tags.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for generating a shape tag cloud display, comprising:
    receiving, in the data processing system, a user input specifying an input arbitrarily hand-drawn shape tag, wherein the input arbitrarily hand-drawn shape tag is a non-text graphical symbol that is an annotation added to an existing electronic document by the user input;
    updating a set of shape tag equivalence classes within the data processing system based on the received user input to assign the input arbitrarily hand-drawn shape tag to a shape tag equivalence class having similar previously entered arbitrarily hand-drawn shape tags;
    generating, by the data processing system, rankings of shape tags, in the shape tag equivalence classes, relative to one another;
    generating, by the data processing system, the shape tag cloud display based on the generated rankings, wherein a representation of shape tags in each shape tag equivalence class in the set of shape tag equivalence classes, within the shape tag cloud display, has display characteristics based on the generated rankings;
    associating, with each shape tag in the shape tag cloud display, a link to one or more electronic documents associated with the shape tag;
    outputting, by the data processing system, the shape tag cloud display
    receiving a selection of a shape tag in the shape tag cloud display;
    in response to receiving the selection of the shape tag in the shape tag cloud display, providing a listing of the one or more electronic documents associated with the selected shape tag, wherein entries in the listing comprise a title of a corresponding electronic document and an associated degree of matching between the corresponding electronic document and a shape tag equivalence class corresponding to the selected shape tag;
    receiving a selection of an entry in the listing of the one or more electronic documents to thereby select an electronic document from the listing; and
    in response to receiving the selection of the electronic document, providing an output of the selected electronic document.

2. The method of claim 1, wherein the user input is at least one of a newly drawn arbitrarily hand-drawn shape tag, a selection of a previously stored arbitrarily hand-drawn shape tag from a library or palette of shape tags, a combination of one or more previously defined shape tags, or a sub-portion of a previously defined shape tag.

3. The method of claim 1, wherein updating the set of shape tag equivalence classes further comprises:
    performing an analysis of the input arbitrarily hand-drawn shape tag to generate first characteristic information corresponding to the input arbitrarily hand-drawn shape tag;
    comparing the first characteristic information of the input arbitrarily hand-drawn shape tag with second characteristic information of one or more previously entered shape tags in one or more shape tag equivalence classes;
    determining a degree of matching between the first characteristic information and the second characteristic information for each of the shape tag equivalence classes; and
    assigning the input arbitrarily hand-drawn shape tag to a shape tag equivalence class based on the degree of matching.

4. The method of claim 3, wherein the analysis of the input arbitrarily hand-drawn shape tag comprises at least one of a pixel count based analysis, pixel color analysis, or an analysis of primary contours or gradients.

5. The method of claim 3, wherein the analysis of the input arbitrarily hand-drawn shape tag comprises at least one of determining one or more mathematical formulas for generating the input arbitrarily hand-drawn shape tag, generating a table of data points of the input arbitrarily hand-drawn shape tag, or a centerpoint and radius analysis.

6. The method of claim 3, wherein determining the degree of matching further comprises, for each shape tag equivalence class in the shape tag equivalence classes, determining at least one of a total number of matching previously entered shape tags, a frequency of occurrence of matching previously entered shape tags, or usage statistics for electronic documents associated with matching previously entered shape tags.

7. The method of claim 1, wherein generating rankings of shape tags comprises, for each shape tag, at least one of:
    generating a first relative ranking of the shape tag relative to other shape tags in a same shape tag equivalence class; and
    generating a second relative ranking of the shape tag equivalence class relative to other shape tag equivalence classes.

8. The method of claim 7, wherein generating rankings of shape tags comprises, for each shape tag:
    generating a ranking for the shape tag by combining the first relative ranking and the second relative ranking.

9. The method of claim 7, wherein, for each shape tag, the ranking for the shape tag is based on the second relative ranking of the shape tag equivalence class to which the shape tag belongs.

10. The method of claim 1, wherein generating the shape tag cloud display based on the generated rankings, comprises generating representations of shape tags where each representation of shape tags has display characteristics corresponding to its associated ranking, and wherein higher ranking shape tags have display characteristics that are more prominent in the shape tag cloud display than lower ranking shape tags.

11. The method of claim 10, wherein the display characteristics of a higher ranking shape tag is at least one of occupying a relatively larger portion of the shape tag cloud display than other lower ranking shape tags, highlighted in a more saturated color than other lower ranking shape tags, having a higher luminance than other lower ranking shape tags, or being oriented in a different direction than other lower ranking shape tags.

12. The method of claim 1, wherein generating rankings of shape tags further comprises, for at least one shape tag, applying a click-through statistic of an electronic document associated with the at least one shape tag, to a ranking of the shape tag to generate a modified ranking of the shape tag.

13. The method of claim 1, wherein each shape tag is associated with an electronic document in an electronic document collection, and wherein each electronic document in the electronic document collection has zero or more shape tags associated with the electronic document.

14. The method of claim 13, wherein the electronic documents comprise at least one of web pages, computer files, electronic mails, images, audio electronic documents, or video electronic documents.

* * * * *